May 22, 1928. 1,670,833
D. E. ANDERSON
BRAKE
Filed Feb. 28, 1923 3 Sheets-Sheet 2
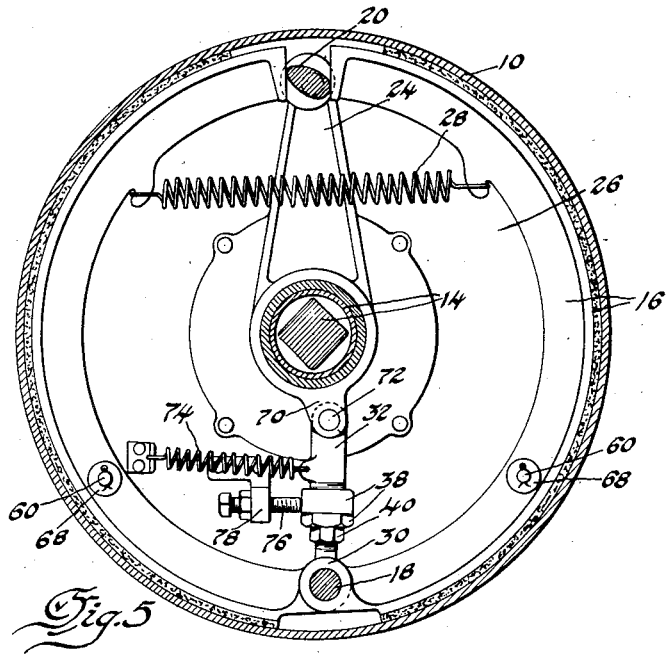
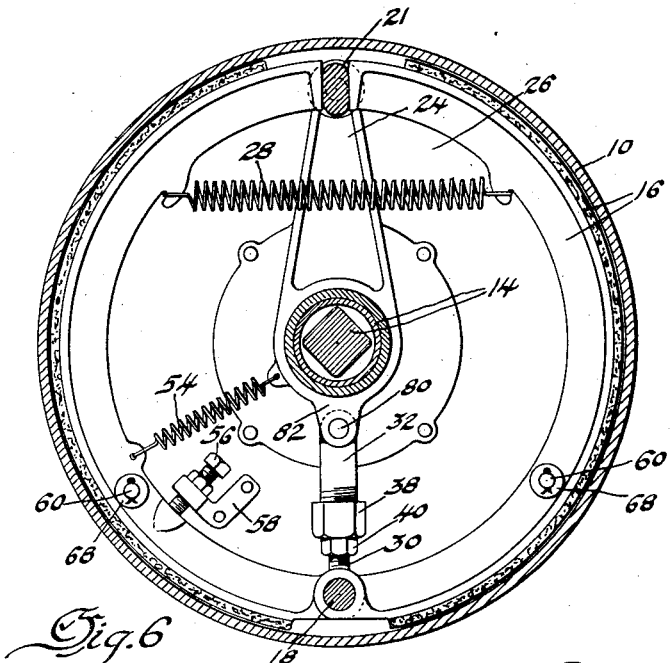
Inventor
David E. Anderson
By his Attorneys
Blackmore, Spencer & Flint

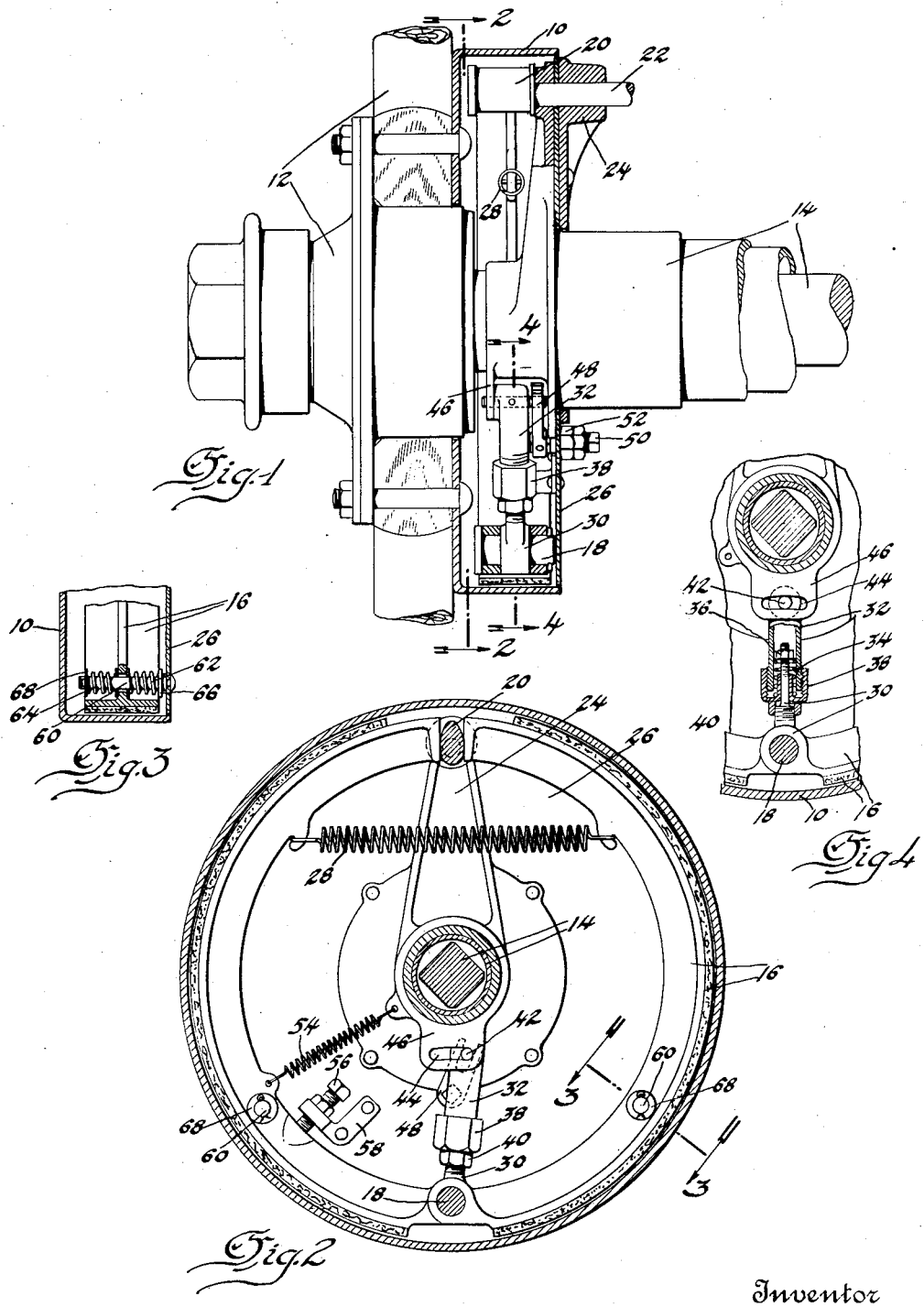

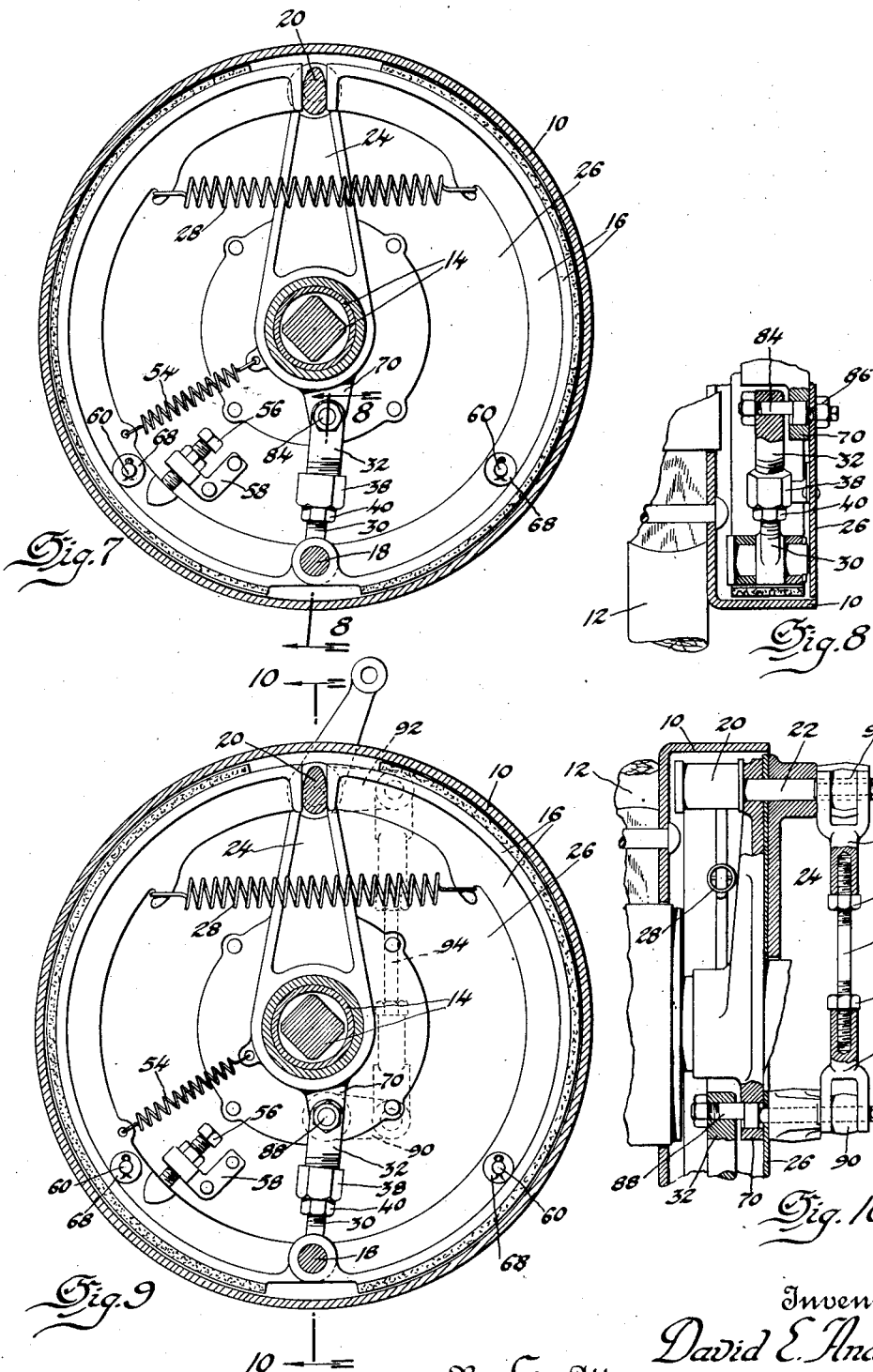

Patented May 22, 1928.

1,670,833

UNITED STATES PATENT OFFICE.

DAVID E. ANDERSON, OF DETROIT, MICHIGAN, ASSIGNOR TO GENERAL MOTORS CORPORATION, OF DETROIT, MICHIGAN, A CORPORATION OF DELAWARE.

BRAKE.

Application filed February 28, 1923. Serial No. 621,776.

This invention relates to brakes, and is illustrated as embodied in several differently modified rear wheel automobile brakes of the "full wrapping" type.

An object of the invention is to secure more rapid and powerful operation of a brake of this character by providing novel means, such as an offset link or other member, for moving the brake band or shoe radially when the brake is applied. In the preferred form, such a link is pivoted on a fixed support at one side of the drum diameter passing through the point at which it is attached to the band, so that circumferential movement of the band operates the link to move the band radially, the support and link being in effect fixed and movable toggle members constituting a toggle which approaches a radial position as it is straightened by the circumferential movement of the band. In one desirable modification, means such as an eccentric is provided for adjusting the link radially to take up for wear, and the brake-operating connections are arranged to operate the eccentric or other means additionally to move the band radially when the brake is applied.

For the further purpose of insuring uniformity of action in a brake of this type, the band, according to another feature of the invention, is supported by a yielding device acting on an intermediate portion, and shown as urging the band to idle position in the direction of the drum diameter passing through the brake cam. This device is shown as comprising a spring arranged to be overcome by expansion of the band and from a manufacturing standpoint the spring may very conveniently be interposed between coaxial members making up the above described link. To control the effect of the spring on the braking action of the band, means may be provided for adjusting its tension.

Other features of the invention relate to an improved anti-rattling device, a new arrangement for determining the idle position of the band, a novel double cam for expanding the band and a modified arrangement for adjustably varying the offset distance of the above-described link; and these, and features relating to various specific combinations of parts and desirable particular constructions, will be apparent from the following description of several differently modified illustrative embodiments of the invention shown in the accompanying drawings, in which:

Figure 1 is a section through one form of brake and through parts of the associated wheel and axle;

Figure 2 is a section on the line 2—2 of Figure 1, showing parts of the brake in side elevation;

Figure 3 is a section on the line 3—3 of Figure 2, showing one of the improved anti-rattling devices;

Figure 4 is a section generally on the line 4—4 of Figure 1, but with the parts in different positions, showing the band supporting link;

Figure 5 is a view, corresponding to Figure 2, showing a modified form;

Figure 6 is a similar view of a second modified form;

Figure 7 is a similar view of a third modified form, in which an eccentric is provided for adjusting the link radially;

Figure 8 is a section on the line 8—8 of Figure 7, showing the arrangement of the eccentric;

Figure 9 is a view corresponding to Figure 7 of a fourth modification, in which the brake cam is connected to the eccentric to operate it to move the brake band radially when the brake is applied; and Figure 10 is a section on the line 10—10 of Figure 9, showing the eccentric-operating connections.

Each of the illustrative embodiments of the invention comprises a drum 10 secured to a wheel 12 carried by an axle 14, shown in Figure 1 as a semi-floating axle. The drum encircles a brake band 16, consisting of two shoes pivoted together at 18. The brakes are of the "full-wrapping" type, i. e., the pivot 18 is not held in any fixed support and the band 16 therefore has a limited circumferential movement. The band is expanded by a novel cam 20 or 21 (Fig. 6) carried by a rock-shaft 22 journaled in a support 24 fixed on the axle housing, and a plate 26 covers the open end of the drum. Opposite ends of the band are held against the cam by a spring 28.

In the first modification, shown in Figs. 1-4, the band is yieldingly supported by a link comprising co-axial members 30 and 32, with a coil spring 34 (Fig. 4) interposed between a washer held by a nut 36 threaded on member 30 and a bushing 38 threaded on member 32, a stop 40 being threaded on an enlarged lower part of member 30 to engage the bottom of the bushing. By adjusting nut 36, bushing 38, and stop 40, the normal length of the link and the tension of spring 34 (and therefore its action on the braking effect of band 16) can be changed as desired. This arrangement, with changes specifically described below, but including in each case spring 34, is illustrated as embodied in all of the modifications.

In this modification, in order to permit adjustment of the distance and direction the link is offset, the upper end of member 32 carries a pin 42 entering at one end a slot 44 in a fixed lug 46 formed on support 24, the other end carrying a block slidingly held in the forked end of an arm 48, constituting means for moving pin 42 in slot 44, to adjust its position and also to throw it to one side or the other of that diameter of the brake drum 10 which passes through pivot 18. Arm 48 is arranged to be operated by the squared head 50 of a small rock-shaft journaled in plate 26, and to be clamped in any desired position by lock nuts 52.

When the above described link is off-set to one side of the drum diameter, as shown in Figure 2, and cam 20 is turned in a counter-clockwise direction, the link and fixed lug or support 46 in effect constitute respectively movable and fixed toggle members of a toggle which approaches a radial position as it is straightened by circumferential movement of the band, and which therefore moves the band radially against the inside of the drum. While most of the torque, as in all full-wrapping brakes, is taken by the cam 20, a considerable component is transferred longitudinally of the link, by a wedging action to lug 46. Spring 34 allows for automatic coordination between the expansion of the band, which tends to lengthen the link, and the straightening of the toggle, which tends to shorten it.

The idle position of the band is, in part, determined by a spring 54, urging an enlarged portion of the web of the band against a stop 56, adjustably threaded into a bracket 58 attached to plate 26. Rattling is prevented by improved devices each comprising a member 60, having limited universal movement with respect to plate 26, and surrounded by opposed springs 62 and 64, holding the web of band 16 between them, and confined between washers 66 and 68 held on opposite ends of member 60. Such antirattling devices are shown used with all the modified forms of brakes. It is also to be noted that, when the band moving link 30—32 is offset as shown in Figure 2, a novel cam is used having one portion (the lower) with a throw just sufficient to take up play in its end of the band and another and diametrically-opposite portion (the upper) having a greater throw sufficient to move the band circumferentially to expand it. As shown in Figure 4, pin 42 may, if desired, be held anywhere between its two extreme positions.

The modification shown in Fig. 5 differs from the one described above, in that member 32 is connected to lug 70, corresponding to lug 46, by a pivot 72 which is offset but not adjustable, and further in that spring 74, corresponding to spring 54, acts on the link instead of the band, and urges it against a stop 76 threaded in a bracket 78 attached to plate 26.

The third modification differs from the first two in that pivot 80 for member 32 is arranged centrally of its lug 82, the link in this case serving as a support for the band but not having any toggle or wedging action.

Cam 21 used with this form has a symmetrical form such that it operates equally on the opposite ends of the band.

The modification shown in Figures 7 and 8 differs from that of Fig. 5, in that member 32 is pivoted on an eccentric or crank portion of a short spindle 84 which has one end extending through lug 70 and plate 26 into a position to be adjusted to take up for wear of the brake band, the spindle being turned to cause the eccentric portion to move the link radially. The spindle is clamped in adjusted position by a nut 86.

In the modification of Figures 9 and 10, a spindle 88, corresponding to spindle 84 of Figure 8, has an eccentric portion carrying member 32, and has at its end an arm 90, arranged to be connected to an arm 92 on the brake cam shaft 22 so that the link 30—32 and the brake band 16 are moved radially by the eccentric portion when the brake cam is operated. In order to provide an adjustment to take up for wear, this connection is in the form of a rod 94, oppositely threaded on its opposite ends, held in recesses in the ends of forks 96 and 98, respectively pivoted to arms 90 and 92. The adjustment is preserved by clamp nuts 100 and 102.

It will be appreciated that various other modifications may be made within the spirit of my invention, and accordingly I do not wish to be understood as limiting its scope by the foregoing description of particular embodiments or otherwise than by the terms of the appended claims.

I claim:

1. A brake comprising, in combination, a drum, a cam, an internal floating band engaging the cam at opposite ends, a pivotally-mounted yielding link supporting an intermediate portion of the band, and means for shifting the link and determining its position at one side or the other of a diameter of the brake drum.

2. A brake comprising, in combination, a drum, a cam, an internal floating band engaging the cam at opposite ends, a member supporting an intermediate portion of the band, and means for shifting the member and determining its position at one side or the other of a diameter of the brake drum.

3. A brake comprising, in combination, a drum, a cam, an internal floating band engaging the cam at opposite ends, a member pivotally connected to an intermediate portion of the band, a support arranged within the drum, a shiftable connection between the support and said member, and a device for shifting said connection from one side to the other of a diameter of the drum.

4. A brake comprising, in combination, a drum, a cam, an internal floating band engaging the cam at opposite ends, a member pivotally connected to an intermediate portion of the band, a support arranged within the drum, a pin-and-slot connection between the support and said member, allowing said member to be shifted from one side to the other of a diameter of the drum, and means for holding said member in either position.

5. A brake comprising, in combination, a drum, a cam, an internal floating band engaging the cam at opposite ends, a member pivotally connected to an intermediate portion of the band, a support arranged within the drum, and a pin-and-slot connection between the support and said member, allowing said member to be shifted in a direction substantially perpendicular to a diameter of the drum.

6. A brake comprising, in combination, a drum, a cam, an internal floating band engaging the cam at opposite ends, a support within the circumference of the drum, and a member connected to an intermediate part of the band and connected to the support in such a manner that it may be shifted from one side to another of a diameter of the brake drum.

7. A brake comprising, in combination, a drum, a cam, a floating band in the drum engaging the cam at opposite ends, and a link supporting an intermediate portion of the band in a fixed position when said band is out of engagement with the drum, and which link is yieldingly extensible to permit said intermediate portion to be moved into engagement with said drum.

8. A brake comprising, in combination, a drum, a cam, a floating band in the drum engaging the cam at opposite ends, and a pivotally-supported link pivotally connected to the band substantially diametrically opposite the cam; said link being yieldingly extensible to permit said band to move into engagement with said drum, and having a stop for determining the off position of said band.

9. A brake comprising, in combination, a drum, a cam, a floating band in the drum engaging the cam at opposite ends, and a pivotally supported band supporting link pivotally connected with said band intermediate its ends and having co-axial members 30 and 32 and an interposed compression spring 34.

10. A brake comprising, in combination, a drum, an internal band having a limited circumferential movement, a double brake cam between the ends of the band having one cam portion with a throw substantially equivalent to the play in its end of the band and having another and diametrically opposite cam portion with a greater throw to move the band circumferentially to apply braking pressure, and a device operated by said circumferential movement to move radially an intermediate portion of the band.

In testimony whereof I affix my signature.

DAVID E. ANDERSON.